United States Patent

Jager

[11] 4,034,872
[45] July 12, 1977

[54] MOTORCYCLE RACK FOR A TOW TRUCK

[76] Inventor: David A. Jager, 625 S. Stadium, Oregon, Ohio 43616

[21] Appl. No.: 716,274

[22] Filed: Aug. 20, 1976

[51] Int. Cl.² .......................................... B60P 3/12
[52] U.S. Cl. ............................................. 214/86 A
[58] Field of Search ........................ 214/86 A, 450

[56] References Cited

U.S. PATENT DOCUMENTS

| 3,892,321 | 7/1975 | Westbrook | 214/86 A |
| 3,963,129 | 6/1976 | Clayton | 214/450 X |

Primary Examiner—Robert G. Sheridan
Attorney, Agent, or Firm—Marshall & Yeasting

[57] ABSTRACT

The motorcycle rack is adapted to be mounted on a tow truck sling that consists of a V-shaped bracket the legs of which are pivoted to the truck and the nose of which is provided with a cross-bar hung by means of straps from a hoist. The rack comprises a fork adapted to be carried by said cross-bar in front of said straps and having two forwardly-extending legs the ends of which are adapted to be secured to the legs of said V-shaped bracket. The fork extends rearward past said straps and carries a platform for supporting a motorcycle in a position leaning forward against said straps.

4 Claims, 4 Drawing Figures

MOTORCYCLE RACK FOR A TOW TRUCK

BACKGROUND OF THE INVENTION

Operators of tow trucks are frequently called upon to pick up disabled motorcycles. However, a motorcycle is liable to become damaged while being transported by an ordinary tow truck, because there is no way in which a motorcycle can be safely carried by an ordinary tow truck.

Usually the operator of a tow truck simply attaches the motorcycle to the hoist and allows it to dangle. U.S. Pat. No. 3,892,321 shows a bar by means of which the hook suspending a motorcycle is held spaced away from the rear end of a tow truck. Even in that case, however, if the driver of a tow truck makes a sudden stop, the dangling motorcycle is liable to swing forward and become scratched or otherwise damaged.

SUMMARY OF THE INVENTION

The principal object of the invention is to provide a motorcycle rack consisting of two relatively light parts which can be quickly attached to a tow truck. When the present rack is in use, the motorcycle is securely supported in such a way that is cannot swing and therefore cannot become damaged when being transported.

DESCRIPTION OF THE PREFERRED EMBODIMENT

Figure 1:
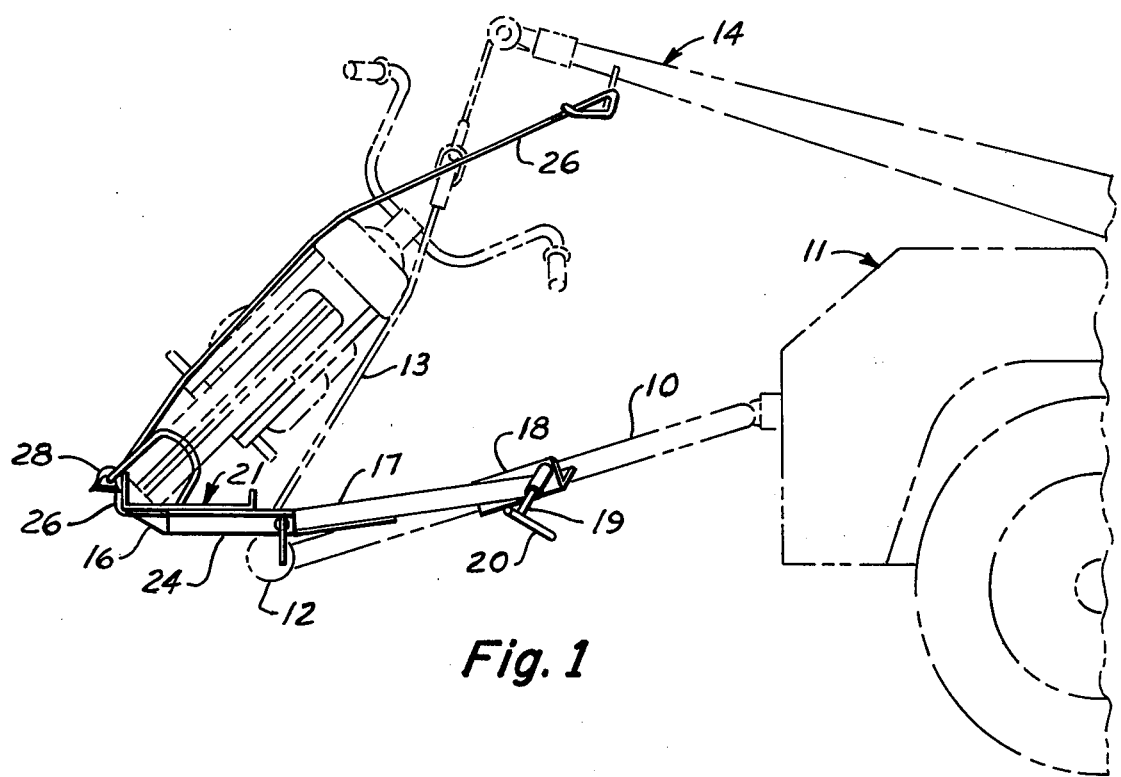
FIG. 1 is a side view showing a motorcycle mounted on a tow truck by means of the present rack.
Figure 2:
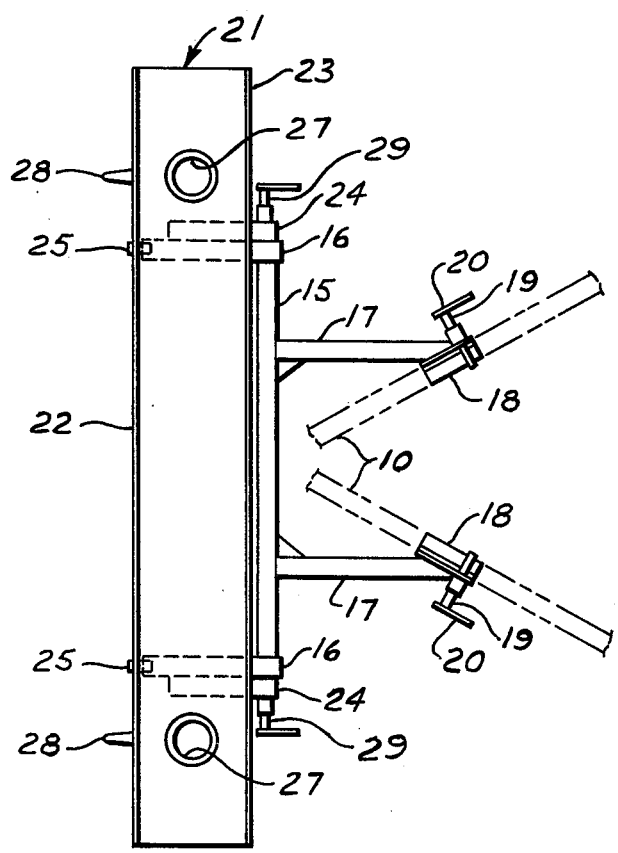
FIG. 2 is a plan view of a preferred form of rack embodying the present invention, of the type which is shown in use in FIG. 1.
Figure 3:
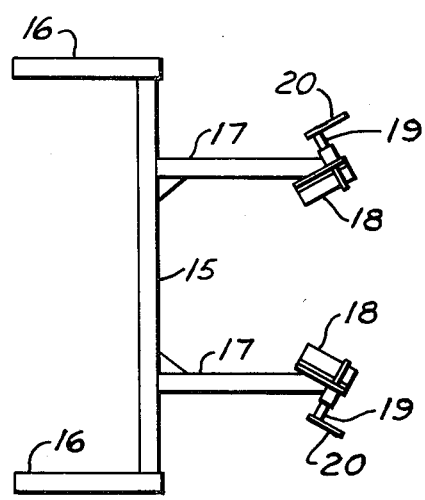
FIG. 3 is a plan view of the fork portion of the rack shown in FIG. 2.
Figure 4:
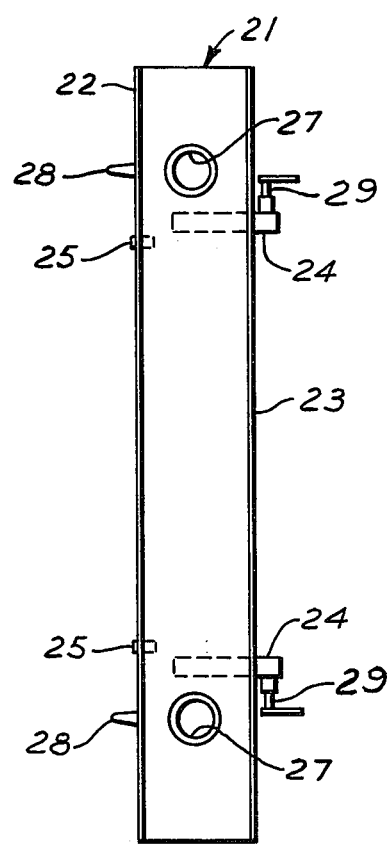
FIG. 4 is a plan view of the platform portion of the rack.

The motorcycle rack of the present invention is adapted to be mounted on a tow truck sling that consists of a V-shaped bracket comprising two legs 10 that are pivoted to the rear end of a tow truck 11. In the conventional construction of such a sling, as commonly provided on a tow truck, the nose portion of the V-shaped bracket formed by the legs 10 is provided with a cross-bar 12 which is hung by means of straps 13 from a hoist 14.

The motorcycle rack of the present invention comprises a fork consisting of a cross-piece 15 of square tubing, to the ends of which are welded two angles 16 forming the tines of the fork.

Two legs 17 of square tubing are welded to the cross-piece 15. Welded to the end of each of the legs 17 is a short piece of angle 18 in which one of the legs 10 of the V-shaped bracket of the tow truck is adapted to seat. Each of the angle pieces 18 is provided with a spring-pressed pin 19 having a handle 20 by means of which the pin may be withdrawn against the tension of the spring. Except when withdrawn by means of the handle 20, each of the pins 19 extends above the leg 10 so as to secure the angle piece 18 in position on the leg 10.

In order to mount the fork portion of the present rack on a V-shaped bracket of a tow truck, the fork is brought inside of and parallel to the straps 13, with the legs 17 of the fork straddling the legs 10 of the V-shaped bracket and resting upon the ground. The fork is then tilted by bringing the legs 17 toward the tow truck, until the cross-piece 15 of the fork rests upon the cross-bar 12. The legs 17 of the fork are then raised so that the legs 10 of the V-shaped bracket can be seated on the short pieces of angle 18 and secured in place by means of the spring-pressed pins 19.

After the fork has thus been mounted on the V-shaped bracket of the tow truck, a platform for supporting a motorcycle is placed upon the angles 16 which form the tines of the fork. The platform 21 has an upstanding flange 22 along its rear edge, and may also have an upstanding flange 23 along its front edge. Welded to the bottom of the platform 21 are two locating angles 24. The plaform 21 is properly located on the fork by placing it in such a position that each of the locating angles 24 is just outside of an angle 16 which forms one of the tines of the fork. After the platform 21 has been properly located relative to the fork, the platform is slid toward the tow truck until two locking fingers 25 extend beneath the rear ends of the angles 16, thus locking the platform 21 against tilting relative to the fork. When the platform 21 is thus located in its final position, a spring-pressed pin 29 provided on each of the locating angles 24 can be engaged in a hole provided in each of the angles 16, so as to lock the platform 21 in place.

A motorcycle to be transported on the rack is then placed on the platform 21 in a position leaning forward against straps 13. The motorcycle is lashed in place by means of a pair of ropes secured to the hoist 14. Each of the ropes 26 is pulled down across the side of the motorcycle so that the rope extends over the upstanding flange 22, then down under the platform 21, upward through a hole 27 provided in the platform 21, and around the inner surface of the rim of one wheel of the motorcycle. A loop at the end of the rope 26 is then engaged in a snap hook 28 which is provided on the flange 22. Such lashing of the motorcycle by means of the two ropes 26 is performed after the assembly has been raised by means of the hoist 14 pulling upward on the cables by means of which the straps 13 are suspended. After the motorcycle has been lashed in place by means of the ropes 26, the assembly may be lowered slightly by means of the hoist 14 in order to tighten the ropes 26.

The straps 13 are made of flexible material, and the present rack enables a motorcycle to be fastened securely in place and transported without any danger of scratching or other damage.

I claim:

1. A motorcycle rack adapted to be mounted on a tow truck sling that consists of a V-shaped bracket the legs of which are pivoted to the truck and the nose of which is provided with a cross-bar hung by means of straps from a hoist, said rack comprising a fork adapted to be carried by said cross-bar in front of said straps and having two forwardly-extending legs the ends of which are adapted to be secured to the legs of said V-shaped bracket, said fork extending rearward past said straps and carrying a platform for supporting a motorcycle in a position leaning forward against said straps.

2. A motorcycle rack according to claim 1 wherein the platform has an upstanding flange along its rear edge.

3. A motorcycle rack according to claim 1 wherein the platform is detachable from the fork.

4. A motorcycle rack according to claim 1 wherein the plaftorm is provided with holes to facilitate lashing the wheels of a motorcycle to the platform.

* * * * *